(12) United States Patent
Sugimoto et al.

(10) Patent No.: US 8,222,866 B2
(45) Date of Patent: Jul. 17, 2012

(54) ELECTRICALLY-POWERED VEHICLE

(75) Inventors: Tetsuya Sugimoto, Chiryu (JP); Yoshihito Kondo, Nisshin (JP); Koichi Sugiura, Toyota (JP); Yasuhiko Ishimaru, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 273 days.

(21) Appl. No.: 12/681,439

(22) PCT Filed: Oct. 21, 2008

(86) PCT No.: PCT/JP2008/069009
§ 371 (c)(1),
(2), (4) Date: Apr. 2, 2010

(87) PCT Pub. No.: WO2009/054364
PCT Pub. Date: Apr. 30, 2009

(65) Prior Publication Data
US 2010/0219794 A1 Sep. 2, 2010

(30) Foreign Application Priority Data
Oct. 23, 2007 (JP) ................................ 2007-275010

(51) Int. Cl.
*H02J 7/00* (2006.01)
*H02J 9/00* (2006.01)
*B60K 1/00* (2006.01)
(52) U.S. Cl. .......... 320/128; 320/135; 320/136; 307/66; 180/65.1; 180/65.21; 180/65.29
(58) Field of Classification Search .................... 320/128
See application file for complete search history.

(56) References Cited

U.S. PATENT DOCUMENTS

| 6,034,507 | A  | * | 3/2000 | Ikawa et al. | 320/136 |
| RE37,678 | E  | * | 4/2002 | Ikawa et al. | 320/136 |
| 6,455,953 | B1 | * | 9/2002 | Lam | 307/23 |
| 6,724,100 | B1 | * | 4/2004 | Gabriel | 307/9.1 |

(Continued)

FOREIGN PATENT DOCUMENTS

JP    A 8-103004    4/1996

(Continued)

OTHER PUBLICATIONS

Written Opinion of the International Searching Authority issued in corresponding International Application No. PCT/JP2008/069009, mailed Jan. 27, 2009. (with English-language translation).

(Continued)

*Primary Examiner* — Yalkew Fantu
(74) *Attorney, Agent, or Firm* — Oliff & Berridge, PLC

(57) ABSTRACT

A control device turns on a system relay and relays. A first boost converter rectifies an AC voltage supplied through a connector and a first power supply line. Further, the boost converter responds to a signal from the control device to boost the rectified voltage, and outputs the boosted voltage to a second power supply line. A second boost converter receives a voltage from the second power supply line to convert the voltage in accordance with a signal from the control device for output to a third power supply line. Since the system relay and one relay are both turned on, first and second batteries are connected in parallel to the third power supply line and a ground line. The first and second batteries are thereby charged.

4 Claims, 9 Drawing Sheets

U.S. PATENT DOCUMENTS

| | | | |
|---|---|---|---|
| 6,986,398 B2 * | 1/2006 | Obayashi | 180/65.28 |
| 2002/0008496 A1 * | 1/2002 | Shamoto et al. | 320/116 |
| 2003/0107352 A1 | 6/2003 | Downer et al. | |
| 2010/0060080 A1 | 3/2010 | Sawada et al. | |

FOREIGN PATENT DOCUMENTS

| | | |
|---|---|---|
| JP | A 8-107608 | 4/1996 |
| JP | A 9-065577 | 3/1997 |
| JP | A 9-233710 | 9/1997 |
| JP | A 10-136570 | 5/1998 |
| JP | A 2002-010502 | 1/2002 |
| JP | A 2002-084676 | 3/2002 |
| JP | A 2002-165306 | 6/2002 |
| JP | A 2005-269801 | 9/2005 |

OTHER PUBLICATIONS

International Search Report issued in corresponding International Application No. PCT/JP2008/069009, mailed Jan. 27, 2009. (with English-language translation).

Japanese Office Action issued in corresponding Japanese Patent Application No. 2007-275010, mailed Jan. 20, 2009. (with English-language translation).

Japanese Office Action issued in corresponding Japanese Patent Application No. 2007-275010, mailed Apr. 7, 2009. (with English-language translation).

Feb. 17, 2012 Extended Search Report issued in European Patent Application No. 08842806.5.

* cited by examiner

FIG.6

|  | BOOST CONVERTER 10 | | BOOST CONVERTER 20 | |
|---|---|---|---|---|
|  | Q1 | Q2 | Q5 | Q6 |
| VAC>0 | SWITCHING | OFF | SWITCHING | OFF |
| VAC<0 | OFF | SWITCHING | SWITCHING | OFF |

| BOOST CONVERTER 10 | | | | BOOST CONVERTER 20 | |
|---|---|---|---|---|---|
| Q1 | Q2 | Q3 | Q4 | Q5 | Q6 |
| ON | OFF | ON/OFF | OFF/ON | ON | OFF |
| OFF | ON | ON/OFF | OFF/ON | | |

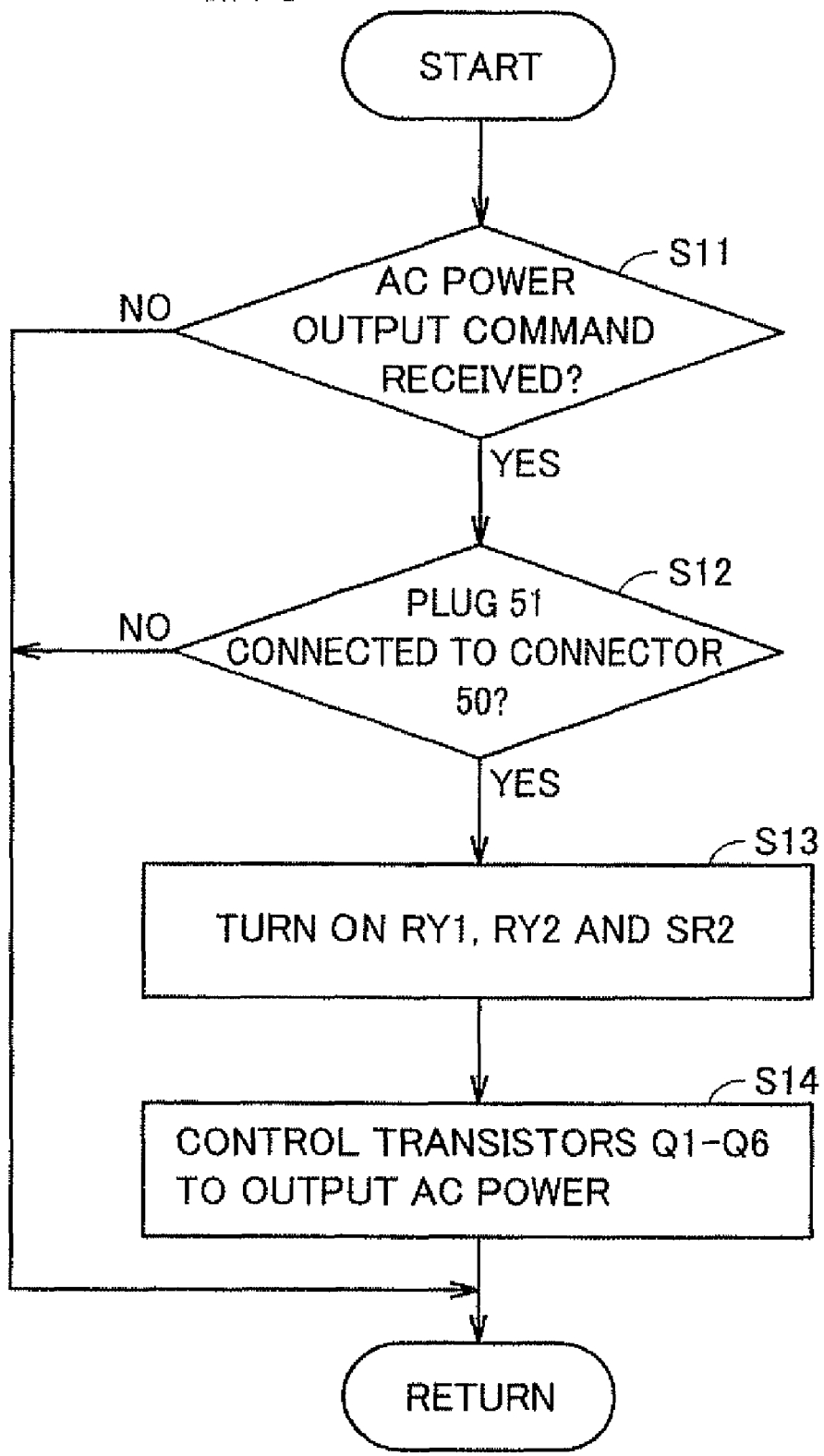

ELECTRICALLY-POWERED VEHICLE

TECHNICAL FIELD

The present invention relates to an electrically-powered vehicle, and more particularly to a vehicle that is configured to be chargeable from the outside.

BACKGROUND ART

Vehicles driven with an electric motor serving as a driving source are conventionally known, such as hybrid vehicles, electric vehicles and fuel cell vehicles. Such a vehicle is equipped with a power storage device such as a battery for storing electric power supplied to the electric motor.

Recently, there have been proposals for configuring a vehicle as mentioned above such that a power storage mechanism is charged from a power supply external to the vehicle, such as a power supply at a house (hereinafter simply referred tows an external power supply as well). Specifically, the power storage device (battery) of the vehicle is charged with electric power supplied from a power supply at a house by coupling a receptacle provided at the house and a connector provided for the vehicle with a cable. Hereinafter, a vehicle whose power storage device such as a battery mounted on the vehicle is chargeable from a power supply external to the vehicle shall be referred to as a "plug-in vehicle" as well.

Japanese Patent Laying-Open No. 10-136570 (Patent Document 1) discloses a charging device mounted on an electric vehicle. This charging device includes a DC/DC converter performing DC-DC conversion on a received direct current (DC) voltage to output the converted voltage, and charging-mode control means. The charging-mode control means electrically disconnects a motor from the DC/DC converter when a battery is charged with electric power from an external power supply. Further, the charging-mode control means causes a voltage from the external power supply to enter the DC/DC converter directly or indirectly, such that a DC voltage output from the DC/DC converter is applied to the battery.

Patent Document 1: Japanese Patent Laying-Open No. 10-136570
Patent Document 2: Japanese Patent Laying-Open No. 2002-84676
Patent Document 3: Japanese Patent Laying-Open No. 9-233710

DISCLOSURE OF THE INVENTION

Problems to be Solved by the Invention

For an electric vehicle, the capability to run a long distance on a single charge is desirable. Similarly, for a hybrid vehicle equipped with an internal combustion engine and configured such that the power storage device is chargeable from the outside, the capability to run a long distance on a single charge without operating the internal combustion engine is desirable. Accordingly, a hybrid vehicle equipped with a plurality of batteries is under consideration.

However, Japanese Patent Laying-Open No. 10-136570 merely discloses a structure for charging a single battery. Therefore, the charging device disclosed in Japanese Patent Laying-Open No. 10-136570 may not be simply applied to a hybrid vehicle equipped with a plurality of batteries.

An object of the present invention is to provide a technique for charging a plurality of batteries mounted on an electrically-powered vehicle from an alternating current (AC) power supply external to the vehicle.

Means for Solving the Problems

In summary, the present invention is directed to an electrically-powered vehicle, including first and second power storage devices being chargeable and dischargeable, a first power line provided in common for the first power storage device and an AC power supply external to the electrically-powered vehicle, a load device for receiving DC power to operate, a second power line for supplying DC power to the load device, a first power conversion unit for converting between DC power supplied to the second power line and one of AC power and DC power supplied to the first power line, a voltage conversion unit electrically connected to the first power storage device and the second power line, a first connection unit connected to the first power storage device and the first power line, and having a conducting state and a non-conducting state, a second connection unit connected to the first power storage device and the voltage conversion unit, and having a conducting state and a non-conducting state, and a control device for controlling at least the voltage conversion unit, the first connection unit and the second connection unit. When AC power is supplied to the first power line from outside the electrically-powered vehicle, the control device controls the first and second connection units to the non-conducting state and the conducting state, respectively, and controlling the voltage conversion unit such that a target voltage is supplied to the first and second power storage devices, based on a voltage value of DC power supplied to the second power line.

Preferably, when AC power is output from the electrically-powered vehicle, the control device controls the first and second connection units to take the non-conducting state and the conducting state, respectively, and controls the voltage conversion unit such that a DC voltage is supplied to the second power line. The first power conversion unit converts the DC voltage received through the second power line to AC power to output the converted AC power to the first power line.

Preferably, the second power line includes a positive bus line, and a negative bus line. The first power conversion unit includes an inductor having one end connected to the first power line, a first switching element connected between the other end of the inductor and the positive bus line, a second switching element connected between the other end of the inductor and the negative bus line, third and fourth switching elements connected in series between the positive bus line and the negative bus line, first and second diodes connected in antiparallel to the first and second switching elements, respectively, and third and fourth diodes connected in antiparallel to the third and fourth switching elements, respectively.

More preferably, the load device includes a second power conversion unit for converting DC power supplied to the second power line to AC power, and a motor for receiving the AC power converted by the second power conversion unit to generate driving force for driving the electrically-powered vehicle.

Effects of the Invention

The present invention allows a plurality of batteries mounted on an electrically-powered vehicle to be charged from an AC power supply external to the vehicle.

BRIEF DESCRIPTION OF THE DRAWINGS

FIG. 6 is a diagram showing an example of a controlled state of transistors during charging.

FIG. 10 is a flow chart describing an AC power output process executed by control device 60.

Figure 1:
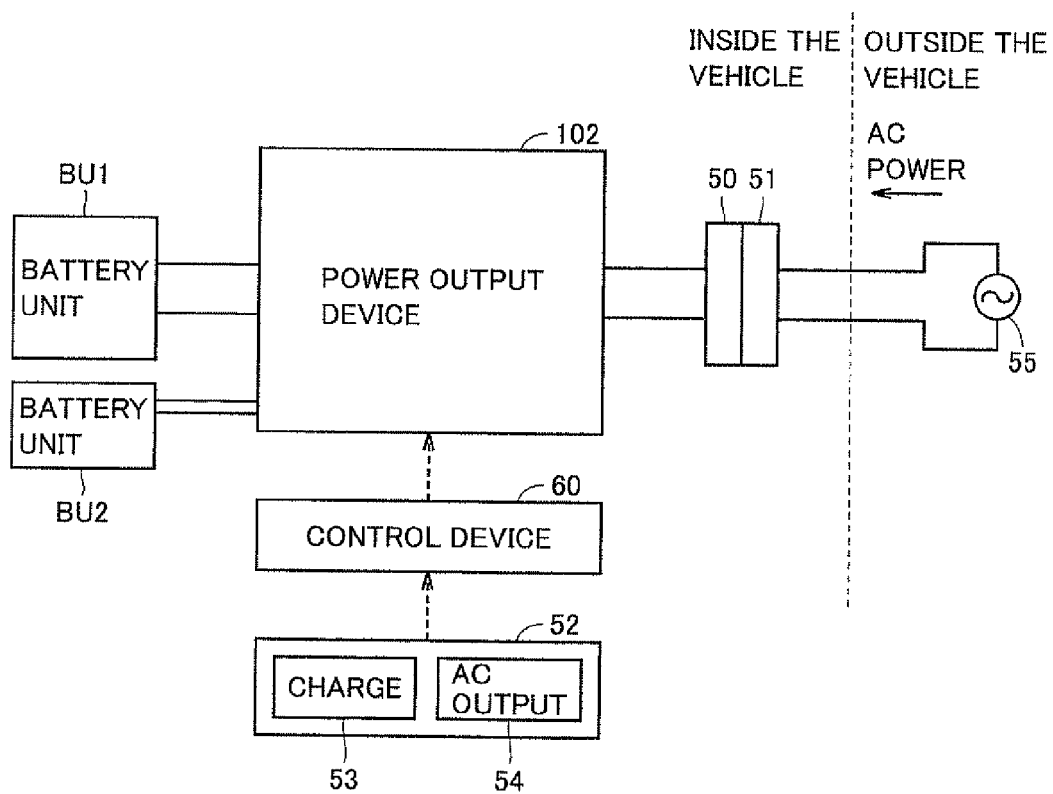
FIG. 1 is a schematic block diagram showing a powertrain of a hybrid vehicle according to an embodiment of the present invention.

DESCRIPTION OF THE REFERENCE SIGNS 2 wheel; 3 power split mechanism; 4 engine; 10, 20 boost converter; 11, 12 chopper circuit; 30, 40 inverter; 32 U-phase arm; 34 V-phase arm; 36 W-phase arm; 50 connector; 51 plug; 52 input/output switching device; 53 charge button; 54 AC output button; 55 commercial power supply; 56 electric equipment; 60 control device; 70-74 voltage sensor; 80, 82-84 current sensor; 100 hybrid vehicle; 102 power output device; B1, B2 battery; BU1, BU2 battery unit; C1-C3 capacitor; D1-D6, D11-D16 diode; L1, L2 reactor; MG1, MG2 motor generator; N1, N2 neutral point; PL1-PL4 power supply line; Q1-Q6, Q11-Q16 npn-type transistor; RY1, RY2 relay; SL ground line; SR1, SR2 system relay; U1, U2 U-phase coil; UL1, UL2 U-phase line; V1, V2 V-phase coil; VL1, VL2 V-phase line; W1, W2 W-phase coil; WL1, WL2 W-phase line.

BEST MODES FOR CARRYING OUT THE INVENTION

In the following, an embodiment of the present invention will be described in detail with reference to the drawings. Like reference characters denote like or corresponding parts throughout the drawings, and the same description will not be repeated.

[Configuration of Electrically-Powered Vehicle]

A plug-in hybrid vehicle (hereinafter referred to as a "hybrid vehicle") will be described as an example of an electrically-powered vehicle according to an embodiment of the present invention. However, the present invention is also applicable to a charging system for a power storage device mounted on a plug-in vehicle embodied by an electric vehicle or a fuel cell vehicle driven solely with driving force from a motor.

FIG. 1 is a schematic block diagram showing a powertrain of a hybrid vehicle according to an embodiment of the present invention. With reference to FIG. 1, hybrid vehicle 100 includes battery units BU1, BU2, a power output device 102, a connector 50, an input/output switching device 52, and a control device 60.

Each of battery units BU1 and BU2 includes a chargeable and dischargeable battery (not shown). Each of battery units BU1 and BU2 generates DC power, and supplies the DC power to power output device 102. Each of battery units BU1 and BU2 stores DC power received from power output device 102.

Power output device 102 includes an engine and a motor generator (neither shown; the same applies hereinbelow), and based on a command received from control device 60, generates driving force for this hybrid vehicle 100. Based on a command received from control device 60, power output device 102 converts AC power from commercial power supply 55 external to the vehicle received at connector 50 to DC power, and outputs the converted DC power to battery units BU1 and BU2.

When charging battery units BU1 and BU2 from commercial power supply 55 external to the vehicle, connector 50 is connected to plug 51. AC power from commercial power supply 55 is thereby supplied to connector 50.

Control device 60 controls power output device 102 to generate driving force, by a method that will be described later. Control device 60 also controls power output device 102 to convert AC power from commercial power supply 55 received at connector 50 to DC power for output to battery units BU1 and BU2, by a method that will be described later.

Input/output switching device 52 is a device for allowing a user to switch between charging of battery units BU1 and BU2 (power feeding to battery units BU1 and BU2) and output of AC power from hybrid vehicle 100 to the outside. Input/output switching device 52 includes a charge button 53 and an AC output button 54 operated by a user. When the user presses charge button 53, input/output switching device 52 produces a command for starting charging of battery units BU1 and BU2, and outputs the command to control device 60. The control device controls power output device 102 in accordance with the command for starting charging, thereby charging battery units BU1 and BU2.

Figure 2:
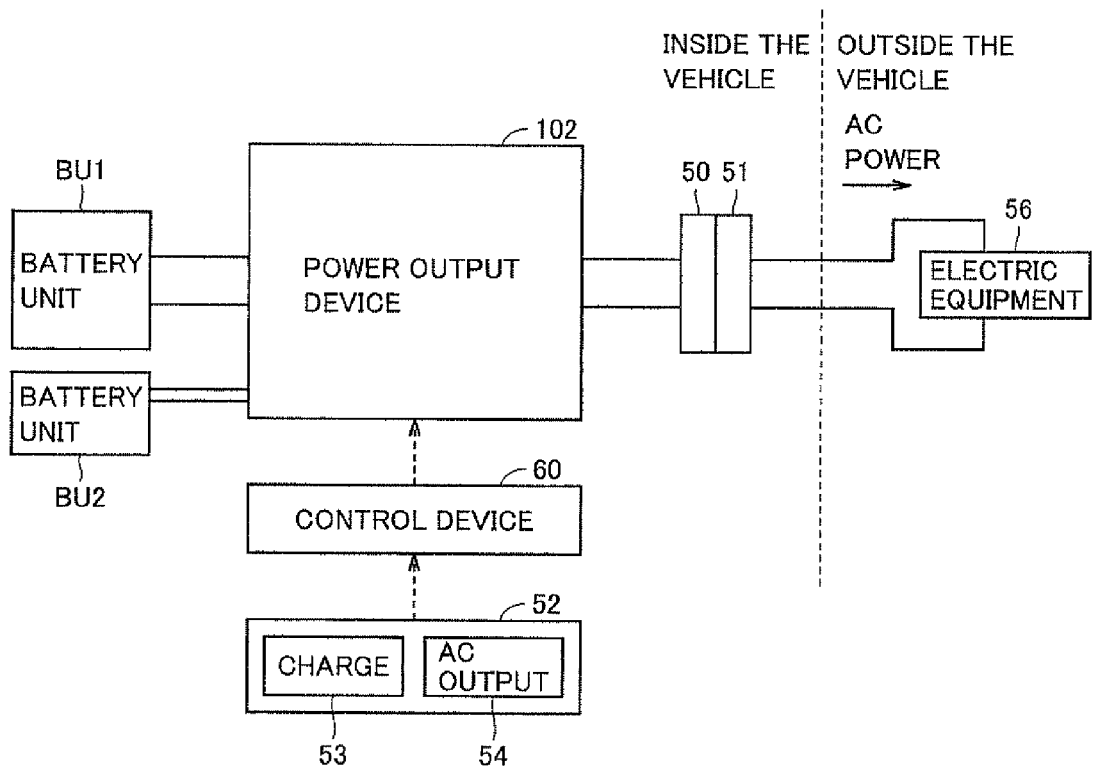
FIG. 2 is a diagram showing a state in which a hybrid vehicle 100 according to the present embodiment serves as an AC power supply.

FIG. 2 is a diagram showing a state in which hybrid vehicle 100 according to the present embodiment serves as an AC power supply. With reference to FIG. 2, hybrid vehicle 100 is connected to electric equipment 56 through plug 51. When a user presses AC output button 54, input/output switching device 52 produces a command for output of AC power from the hybrid vehicle to the outside, and outputs the command to control device 60.

Control device 60 controls power output device 102 to convert DC power received from battery units BU1 and BU2 to AC power for output to connector 50, by a method that will be described later. This enables operation of various types of electric equipment with AC power output from hybrid vehicle 100 in an emergency, for example.

Figure 3:
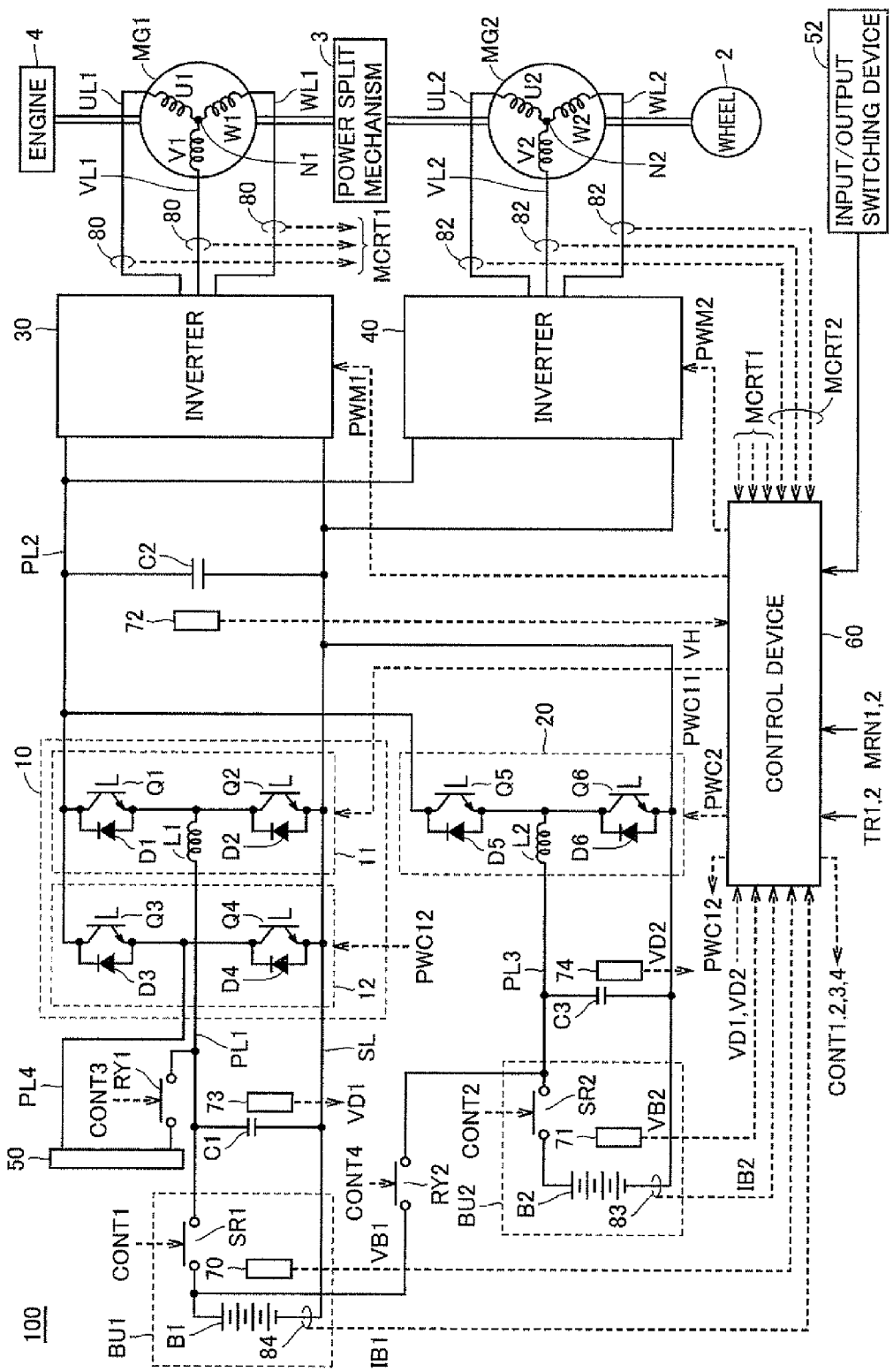
FIG. 3 is a circuit diagram of the powertrain of hybrid vehicle 100 shown in FIGS. 1 and 2.

FIG. 3 is a circuit diagram of the powertrain of hybrid vehicle 100 shown in FIGS. 1 and 2. With reference to FIG. 3, hybrid vehicle 100 includes battery units BU1, BU2, boost converters 10, 20, inverters 30, 40, connector 50, control device 60, power supply lines PL1 to PL4, a ground line SL, U-phase lines UL1, UL2, V-phase lines VL1, VL2, W-phase lines WL1, WL2, motor generators MG1, MG2, engine 4, power split mechanism 3, and a wheel 2.

A portion of this circuit diagram excluding battery units BU1, BU2, connector 50 and control device 60 corresponds to power output device 102 shown in FIG. 1. Motor generators MG1, MG2, and inverters 30, 40 connected to motor generators MG1 and MG2, respectively, constitute a load device.

Power split mechanism 3 is a mechanism coupled to engine 4 and motor generators MG1, MG2 to distribute motive power among them. For example, as the power split mechanism, a planetary gear mechanism having three rotation shafts of a sun gear, a planetary carrier and a ring gear can be used. These three rotation shafts are connected to the rotation shafts of engine 4, motor generator MG1 and motor generator MG2, respectively. For example, arranging a crankshaft of engine 4 to extend through the center of a hollow rotor of motor generator MG1 establishes mechanical connection of engine 4 and motor generators MG1, MG2 to power split mechanism 3.

Motor generator MG2 has a rotation shaft coupled to wheel 2 via a reduction gear and a differential gear not shown. A reduction gear device for the rotation shaft of motor generator MG2 may be further incorporated into power split mechanism 3.

Motor generator MG1 is incorporated into hybrid vehicle 100 to operate as a generator driven by engine 4 and as a motor that can start engine 4. Motor generator MG2 is incorporated into hybrid vehicle 100 as an electric motor for driving wheel 2 which is a driven wheel.

Motor generators MG1 and MG2 are each implemented by, for example, a three-phase AC synchronous motor. Motor generator MG1 includes, as a stator coil, a three-phase coil formed of a U-phase coil U1, a V-phase coil V1 and a W-phase coil W1, Motor generator MG2 includes, as a stator coil, a three-phase coil formed of a U-phase coil U2, a V-phase coil V2 and a W-phase coil W2.

Motor generator MG1 uses an engine output to generate a three-phase AC voltage, and outputs the generated three-phase AC voltage to inverter 30. Motor generator MG1 also generates driving force with a three-phase AC voltage received from inverter 30, and starts the engine with the driving force.

Motor generator MG2 generates driving torque for the vehicle by a three-phase AC voltage received from inverter 40. Motor generator MG2 also generates a three-phase AC voltage during regenerative braking of the vehicle, and outputs the AC voltage to inverter 40.

Battery unit BU1 includes battery B1, a voltage sensor 70, a current sensor 84, and a system relay SR1. Battery B1 has a negative electrode connected to ground line SL. Battery B1 has a positive electrode connected to power supply line PL1 via system relay SR1. Voltage sensor 70 detects a voltage VB1 of battery B1, and outputs detected voltage VB1 to control device 60. Current sensor 84 detects a current IB1 flowing to battery B1, and outputs detected current IB1 to control device 60. System relay SR1 is arranged between the positive electrode of battery B1 and power supply line PL1, and responds to a signal CONT1 from control device 60 to be turned on/off. For example, system relay SR1 responds to signal CONT1 at an H (logic high) level to be turned on, and responds to signal CONT1 at an L (logic low) level to be turned off.

Battery unit BU2 includes battery B2, a voltage sensor 71, a current sensor 83, and a system relay SR2. Battery B2 has a negative electrode connected to ground line SL. Battery B2 has a positive electrode connected to a power supply line PL3 via system relay SR2. Voltage sensor 71 detects a voltage VB2 of battery B2, and outputs detected voltage VB2 to control device 60. Current sensor 83 detects a current IB2 flowing to battery B2, and outputs detected current IB2 to control device 60. System relay SR2 is arranged between the positive electrode of battery B2 and power supply line PL3, and responds to a signal CONT2 from control device 60 to be turned on/off. For example, system relay SR2 responds to signal CONT2 at the H level to be turned on, and responds to signal CONT2 at the L level to be turned off.

Batteries B1 and B2 are mounted on hybrid vehicle 100 as chargeable and dischargeable power storage devices. Batteries B1 and B2 are each implemented by, for example, a nickel metal hydride, lithium ion or similar secondary battery. Alternatively, instead of battery B1 (or battery B2), a large-capacitance electric double-layer capacitor may be mounted on hybrid vehicle 100 as a chargeable and dischargeable power storage device.

Batteries B1 and B2 may be equal or different in power storage capacity. Accordingly, battery B1 may have a power storage capacity larger than that of battery B2, for example.

Boost converter 10 includes chopper circuits 11 and 12. Chopper circuit 11 has a reactor L1, npn-type transistors Q1, Q2 and diodes D1, D2. Reactor L1 has one end connected to power supply line PL1, and the other end connected to a connection point between npn-type transistors Q1 and Q2. Npn-type transistors Q1 and Q2 are connected in series between power supply line PL2 and ground line SL, and each receives at the base a signal PWC11 from control device 60. Diodes D1 and D2 are connected in antiparallel to npn-type transistors Q1 and Q2, respectively. Diodes D1 and D2 are each connected to a corresponding one of the npn-type transistors such that current flows from the emitter to the collector.

Chopper circuit 12 has npn-type transistors Q3, Q4 and diodes D3, D4. Npn-type transistors Q3 and Q4 are connected in series between power supply line PL2 and ground line SL, and each receives at the base a signal PWC12 from control device 60. Diodes D3 and D4 are connected in antiparallel to npn-type transistors Q3 and Q4, respectively. Diodes D3 and D4 are each connected to a corresponding one of the npn-type transistors such that current flows from the emitter to the collector.

Boost converter 20 includes a reactor L2, npn-type transistors Q5, Q6 and diodes D5, D6. Reactor L2 has one end connected to power supply line PL3, and the other end connected to a connection point between npn-type transistors Q5 and Q6. Npn-type transistors Q5 and Q6 are connected in series between power supply line PL2 and ground line SL, and each receives at the base a signal PWC2 from control device 60. Diodes D5 and D6 are connected between the collector and the emitter of npn-type transistors Q5 and Q6, respectively, such that current flows from the emitter to the collector.

For the above-described npn-type transistors and npn-type transistors described below in the present specification, an IGBT (Insulated Gate Bipolar Transistor) may be employed. In the present embodiment, the npn-type transistors may be replaced by power MOSFETs (Metal Oxide Semiconductor Field-effect Transistors) as switching elements.

Figure 4:
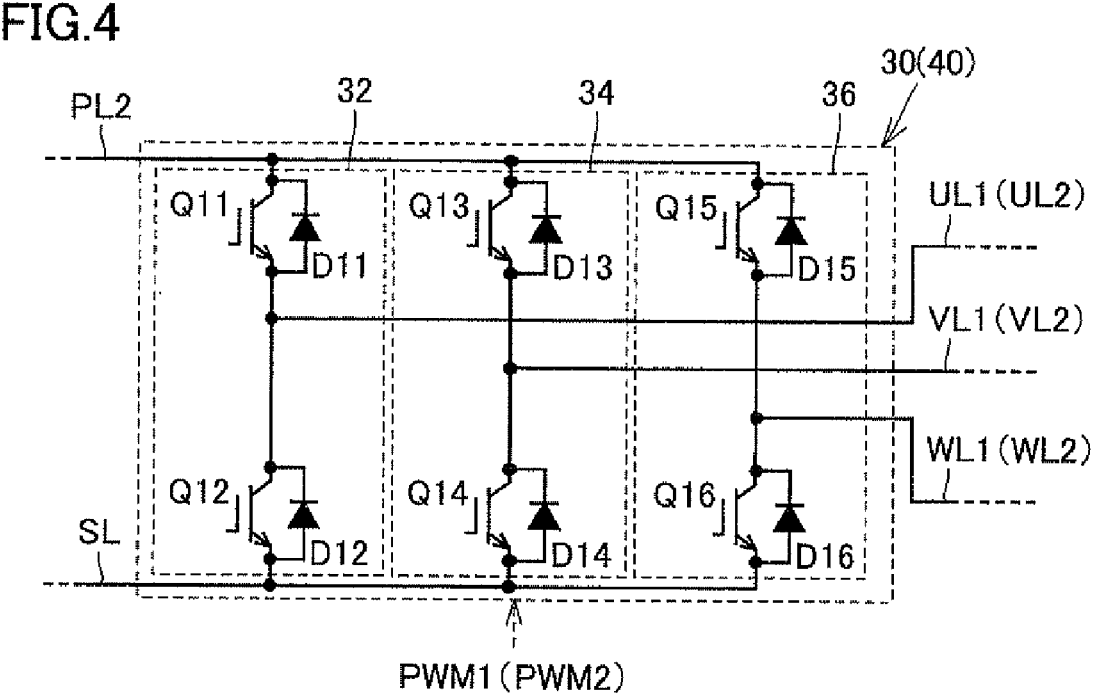
FIG. 4 is a circuit diagram of an inverter 30.

The configuration of inverters 30 and 40 will now be described. FIG. 4 is a circuit diagram of inverter 30. With reference to FIG. 4, inverter 30 includes a U-phase arm 32, a V-phase arm 34 and a W-phase arm 36. U-phase arm 32, V-phase arm 34 and W-phase arm 36 are connected in parallel between power supply line PL2 and ground line SL.

U-phase arm 32 includes npn-type transistors Q11 and Q12 connected in series. V-phase arm 34 includes npn-type transistors Q13 and Q14 connected in series. W-phase arm 36 includes npn-type transistors Q15 and Q16 connected in series. Diodes D11 to D16 are connected between the collector and the emitter of npn-type transistors Q11 to Q16, respectively, such that current flows from the emitter to the collector.

The connection point between the npn-type transistors in each phase arm is connected to a coil end different from a neutral point N1 of each phase coil of motor generator MG1 through U, V or W-phase line UL1, VL1 or WL1 (cf FIG. 3). Npn-type transistors Q11 to Q16 each receives at the base a signal PWM1 from control device 60.

It is to be noted that inverter 40 has a configuration similar to that of inverter 30 shown in FIG. 4. However, the connection point between the npn-type transistors in each phase arm is connected to a coil end different from a neutral point N2 of each phase coil of motor generator MG2 through U, V or W-phase line UL2, VL2 or WL2 (cf. FIG. 3). Inverter 40 receives a signal PWM2 from control device 60.

Referring back to FIG. 3, hybrid vehicle 100 further includes relays RY1, RY2, capacitors C1 to C3, voltage sensors 72 to 74, and current sensors 80 and 82.

Relay RY1 is arranged between power supply line PL1 and connector 50, and responds to a control signal CONT3 from control device 60 to be turned on/off. For example, system relay SR1 responds to signal CONT3 at the H level to be turned on, and responds to signal CONT3 at the L level to be turned off.

Power supply line PL4 has one end connected to connector 50. Power supply line PL4 has the other end connected to the connection point between npn-type transistors Q3 and Q4. Connector 50 includes first and second terminals not shown. The first and second terminals are connected to the one end of power supply line PL4 and relay RY1, respectively.

Relay RY2 is arranged between the positive electrode of battery B1 and power supply line PL3, and responds to a control signal CONT4 from control device 60 to be turned on/off. For example, system relay RY2 responds to signal CONT4 at the H level to be turned on, and responds to signal CONT4 at the L level to be turned off.

Capacitor C1 is connected between power supply line PL1 and ground line SL to reduce the effect on battery B1 and boost converter 10 caused by voltage variations. Voltage sensor 73 detects a voltage VD1 between power supply line PL1 and ground line SL, and outputs detected voltage VD1 to control device 60.

Capacitor C2 is connected between power supply line PL2 and ground line SL to reduce the effect on inverters 30, 40 and boost converters 10, 20 caused by voltage variations. Voltage sensor 72 detects a voltage VH between power supply line PL2 and ground line SL, and outputs detected voltage VH to control device 60.

Capacitor C3 is connected between power supply line PL3 and ground line SL to reduce the effect on battery B2 and boost converter 20 caused by voltage variations. Voltage sensor 74 detects a voltage VD2 between power supply line PL3 and ground line SL, and outputs detected voltage VD2 to control device 60.

Based on signal PWM1 from control device 60, inverter 30 converts a DC voltage received through power supply line PL2 to a three-phase AC voltage to drive motor generator MG1. Motor generator MG1 is thereby driven so as to generate torque designated by a torque command value TR1. Inverter 30 converts a three-phase AC voltage generated by motor generator MG1 upon receipt of an output from engine 4, to a DC voltage based on signal PWM1 from control device 60, and outputs the converted DC voltage to power supply line PL2.

Based on signal PWM2 from control device 60, inverter 40 converts a DC voltage received through power supply line PL2 to a three-phase AC voltage to drive motor generator MG2. Motor generator MG2 is thereby driven so as to generate torque designated by a torque command value TR2.

During regenerative braking of hybrid vehicle 100, inverter 40 converts a three-phase AC voltage generated by motor generator MG2 upon receipt of a rotating force from a driving shaft, to a DC voltage based on signal PWM2 from control device 60, and outputs the converted DC voltage to power supply line PL2.

As used herein, the regenerative braking includes braking accompanied by power regeneration in response to a foot brake operation by a driver driving hybrid vehicle 100, as well as deceleration (or stopping of acceleration) while regenerating power by releasing the accelerator pedal during running, although the foot brake is not operated.

Current sensor 80 detects a motor current MCRT1 flowing to motor generator MG1, and outputs detected motor current MCRT1 to control device 60. Current sensor 82 detects motor current MCRT2 flowing to motor generator MG2, and outputs detected motor current MCRT2 to control device 60.

Based on torque command values TR1, TR2 and motor rotation numbers MRN1, MNR2 of motor generators MG1 and MG2 received from an externally provided ECU (Electronic Control Unit), voltage VD1 received from voltage sensor 73, voltage VD2 received from voltage sensor 74, and voltage VH received from voltage sensor 72, control device 60 generates signals PWC11 and PWC12 for driving boost converter 10 as well as signal PWC2 for driving boost converter 20. Control device 60 outputs signals PWC11 and PWC12 to boost converter 10, and signal PWC2 to boost converter 20.

Control device 60 also generates signal PWM1 for driving motor generator MG1 based on voltage VH as well as motor current MCRT1 and torque command value TR1 of motor generator MG1, and outputs generated signal PWM1 to inverter 30. Control device 60 further generates signal PWM2 for driving motor generator MG2 based on voltage VH as well as motor current MCRT2 and torque command value TR2 of motor generator MG2, and outputs generated signal PWM2 to inverter 30.

When a DC voltage is supplied to boost converter 10 from battery unit BU1 through power supply line PL1, boost converter 10 responds to signal PWC11 from control device 60 to boost the DC voltage for output to power supply line PL2.

When a DC voltage is supplied to boost converter 10 from one or both of inverters 30 and 40 through power supply line PL2, boost converter 10 responds to signal PWC11 from control device 60 to down-convert the DC voltage to the voltage level of battery B1 for charging battery B1.

Similarly, when a DC voltage is supplied to boost converter 20 from battery unit BU2 through power supply line PL3, boost converter 20 responds to signal PWC2 from control device 60 to boost the DC voltage for output to power supply line PL2.

When a DC voltage is supplied to boost converter 20 from one or both of inverters 30 and 40 through power supply line PL2, boost converter 20 responds to signal PWC2 from control device 60 to down-convert the DC voltage to the voltage level of battery B2 for charging battery B2.

When an AC voltage is supplied to boost converter 10 from the outside of hybrid vehicle 100, control device 60 sends signals CONT2, CONT3 and CONT4 to system relay SR2, relay RY1 and relay RY2, respectively, based on a command from input/output switching device 52, thereby turning on these relays. Boost converter 10 rectifies the AC voltage supplied through connector 50, power supply lines PL1 and PL4. Further, boost converter 10 responds to signal PWC11 from control device 60 to boost the rectified voltage. Boost converter 10 then outputs the boosted voltage to power supply line PL2.

Boost converter 20 receives voltage VH through power supply line PL2. Boost converter 20 responds to signal PWC2 from control device 60 to output voltage VD2 to power supply line PL3. Since system relay SR2 and relay RY2 are both on, batteries B1 and B2 are connected in parallel to power supply line PL3 and ground line SL. Batteries B1 and B2 are both thereby charged.

Control device 60 generates signals PWM11 and PWM2 for controlling boost converters 10 and 20, respectively, such that voltage VD2 is suitable for charging batteries B1 and B2. For example, when a peak value of voltage (voltage VH) rectified in boost converter 10 exceeds the upper limit of voltage value suitable for charging batteries B1 and B2, control device 60 generates signal PWC2 for down-converting voltage VH, and outputs signal PWC2 to boost converter 20. Boost converter 20 responds to signal PWC2 to down-convert voltage VH such that voltage VD2 does not exceed the upper limit of voltage value suitable for charging batteries B1 and B2.

When the peak value of voltage (voltage VH) rectified in boost converter 10 falls below the lower limit of voltage value suitable for charging batteries B1 and B2, control device 60 generates signal PWC11 for boosting voltage VH, and outputs signal PWC11 to boost converter 10. Boost converter 10 responds to signal PWC1 to boost the rectified voltage such that voltage VH continuously exceeds the lower limit. In this case, for example, boost converter 20 is controlled by signal PWC2 from control device 60 so as to output a voltage equivalent in magnitude to the voltage output from boost converter 10.

Controlling boost converters 10 and 20 by control device 60 in this manner enables control of charging current flowing to batteries B1 and B2.

When hybrid vehicle 100 supplies AC power to a load (electric equipment 56 shown in FIG. 2) external to hybrid vehicle 100, boost converter 10 responds to signals PWC11 and PWC12 from control device 60 to convert a DC voltage (voltage VH) between power supply line PL2 and ground line SL to an AC voltage. Boost converter 10 outputs the AC voltage to power supply lines PL1 and PL4. Since relay RY1 is on, the AC voltage from boost converter 10 is supplied to electric equipment 56 (cf FIG. 2) connected to connector 50.

[Charging of Batteries and Output of AC Power]

The npn-type transistors will hereinafter be simply referred to as "transistors."

Figure 5:
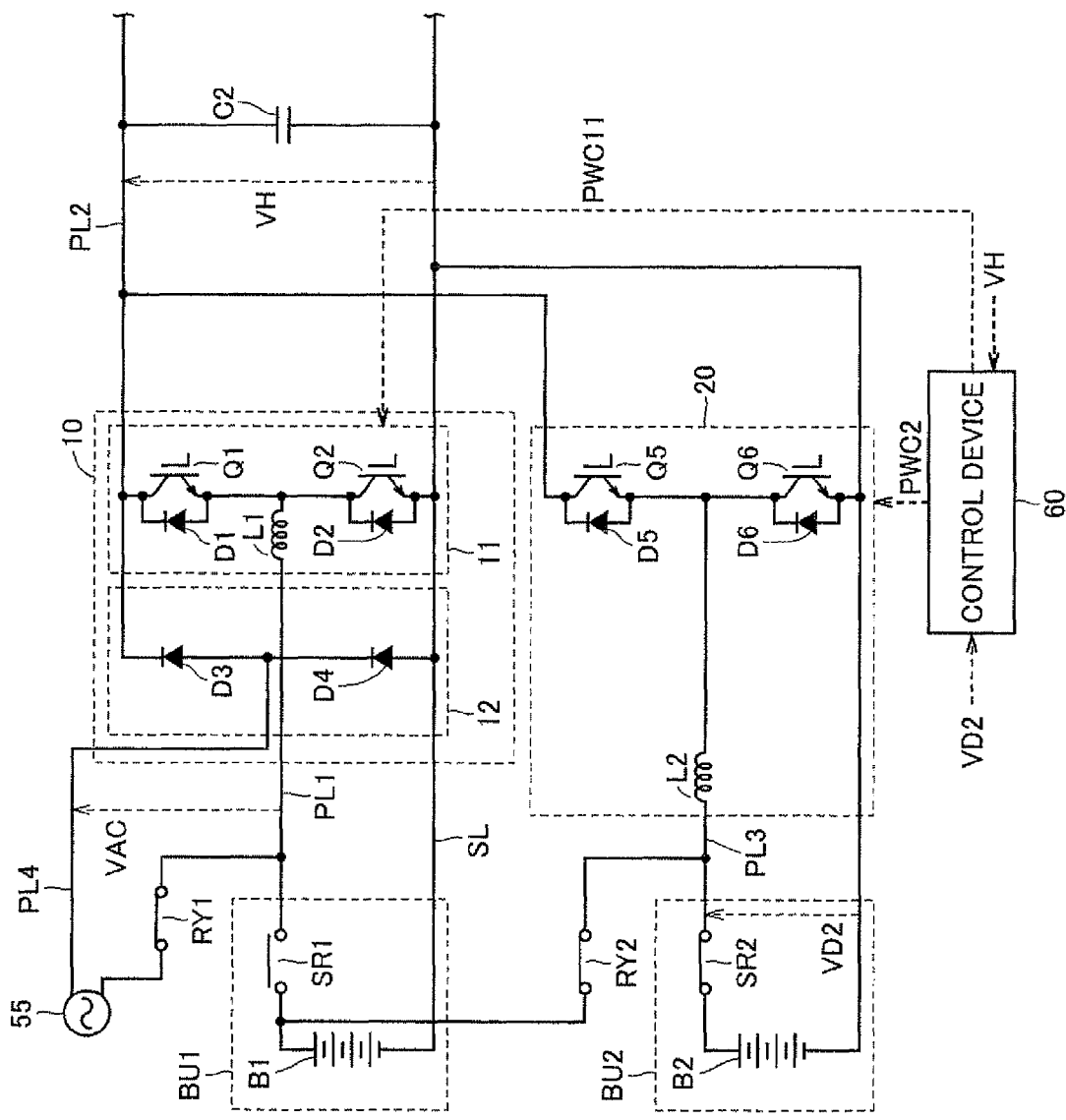
FIG. 5 is a simplified diagram of the circuit diagram of FIG. 2, showing a portion related to charging of batteries B1 and B2 from a commercial power supply 55 external to the vehicle.

FIG. 5 is a simplified diagram of the circuit diagram of FIG. 2, showing a portion related to charging of batteries B1 and B2 from commercial power supply 55 external to the vehicle. FIG. 5 shows battery units BU1, BU2, boost converters 10, 20, relays RY1, RY2, power supply lines PL1 to PL3, ground line SL, capacitor C2, and control device 60. It is to be noted that transistors Q3 and Q4 included in chopper circuit 12 are turned off during charging of batteries B1 and B2 from commercial power supply 55. Accordingly, transistors Q3 and Q4 are not shown in FIG. 5.

As already described, during charging of batteries B1 and B2 from commercial power supply 55, control device 60 turns on relays RY1, RY2 and system relay SR2, and turns off system relay SR1.

FIG. 6 is a diagram showing an example of a controlled state of transistors during charging. With reference to FIGS. 5 and 6, first, when a voltage VAC>0 holds, that is, when the voltage of power supply line PL4 is higher than that of power supply line PL1, transistor Q1 of boost converter 10 is controlled to take a switching state and transistor Q2 to take an off state.

Control device 60 calculates a switching period and a duty ratio of transistor Q1 based on a value of voltage VH. Control device 60 then generates signal PWC11 indicative of the calculated switching period and duty ratio, and outputs signal PWC11 to boost converter 10. Control device 60 controls boost converter 10 such that voltage VH is a first target voltage.

When voltage VAC<0 holds, that is, when the voltage of power supply line PL4 is lower than that of power supply line PL1, transistor Q1 of boost converter 10 is controlled to take the off state, and transistor Q2 to take the switching state.

Control device 60 calculates a switching period and a duty ratio of transistor Q2 based on the value of voltage VH. Control device 60 then generates signal PWC11 indicative of the calculated switching period and duty ratio, and outputs signal PWC11 to boost converter 10. Control device 60 controls boost converter 10 such that voltage VH is the first target voltage.

Diodes D3 and D4 are connected in series between power supply line PL2 and ground line SL such that a forward current flows in a direction from ground line SL to power supply line PL2. Since power supply line PL4 is connected to the connection point between diodes D3 and D4, the AC voltage from commercial power supply 55 is rectified in a boosting operation at boost converter 10.

Transistor Q5 of boost converter 20 is controlled to take the switching state, and transistor Q6 to take the off state. Boost converter 20 thereby down-converts voltage VH to output voltage VD2 to power supply line PL3. Boost converter 20 can thereby flows a charging current from power supply line PL2 to power supply line PL3. This charging current is supplied to batteries B1 and B2, thereby charging batteries B1 and B2.

Control device 60 calculates a switching period and a duty ratio of transistor Q5 based on the values of voltage VH and voltage VD2. Control device 60 then generates signal PWC2 indicative of the calculated switching period and duty ratio, and outputs signal PWC2 to boost converter 20. Control device 60 controls boost converter 20 such that voltage VD2 is a second target voltage. Such operation of boost converters 10 and 20 enables control of the charging current supplied to batteries B1 and B2. Batteries B1 and B2 can thereby be charged appropriately.

Figure 7:
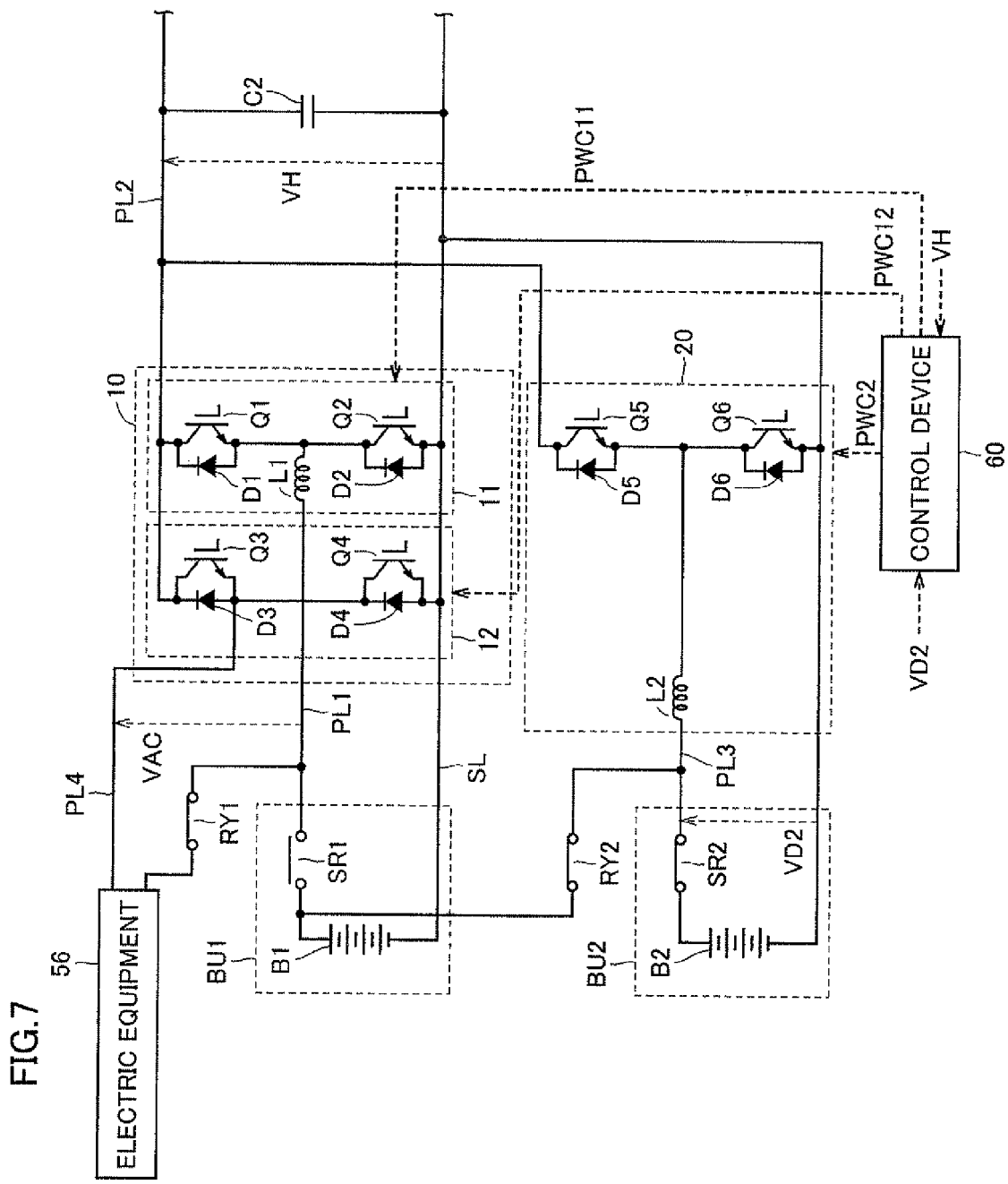
FIG. 7 is a simplified diagram of the circuit diagram of FIG. 2, showing a portion for output of AC power to electric equipment 56 external to the vehicle.

FIG. 7 is a simplified diagram of the circuit diagram of FIG. 2, showing a portion for output of AC power to electric equipment 56 external to the vehicle. FIG. 7 shows battery units BU1, BU2, boost converters 10, 20, relays RY1, RY2, power supply lines PL1 to PL3, ground line SL, capacitor C2, and control device 60. When AC power is output from the vehicle, control device 60 turns on relays RY1, RY2 and system relay SR2, and turns off system relay SR1.

Figures 8, 9:
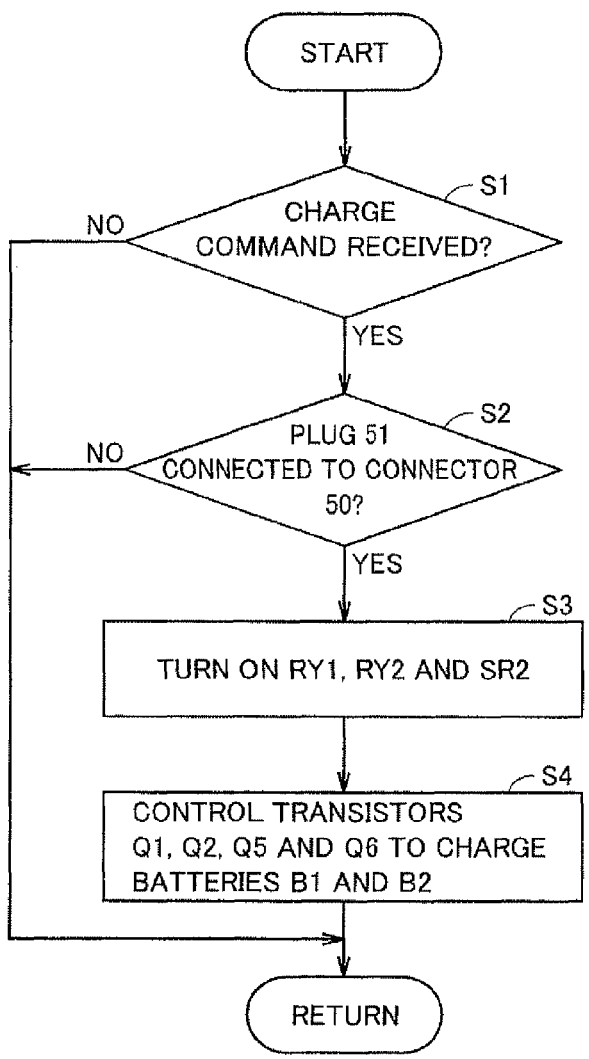
FIG. 8 is a diagram showing an example of a controlled state of transistors during output of AC power.
FIG. 9 is a flow chart describing a charge control process executed on batteries B1 and B2 by a control device 60.

FIG. 8 is a diagram showing an example of a controlled state of transistors during output of AC power. With reference to FIGS. 7 and 8, transistor Q5 of boost converter 20 is controlled to take the on state, and transistor Q6 to take the off state. Accordingly, voltage VH becomes equal to voltage VD2. A voltage between the opposite terminals of battery B1 is also equal to voltage VD2. It is to be noted that control device 60 may boost voltage VD2 by controlling transistor Q5 to take the off state and transistor Q6 to take the switching state. Control device 60 calculates a switching period and a duty ratio of transistor Q6 based on the values of voltage VH and voltage VD2. Control device 60 then generates signal PWC2 indicative of the calculated switching period and duty ratio, and outputs signal PWC2 to boost converter 20.

Control device 60 controls transistor Q1 to take the on state, and transistor Q2 to take the off state. Control device 60 further turns on transistors Q3 and Q4 alternately. More specifically, transistor Q4 is in the off state when transistor Q3 is in the on state, and transistor Q4 is in the on state when transistor Q3 is in the off state. Control device 60 executes PWM (Pulse Width Modulation) control to vary the on periods of transistors Q3 and Q4. The PWM control can be performed by various publicly-known techniques.

Control device 60 then controls transistor Q1 to take the off state, and transistor Q2 to take the on state. Control device 60 further turns on transistors Q3 and Q4 alternately. Control device 60 executes PWM control to vary the on periods of transistors Q3 and Q4.

Such control of transistors Q1 to Q4 by control device 60 brings voltage VAC into an AC voltage. When transistor Q1 is in the on state and transistor Q2 is in the off state, voltage VAC has a negative polarity. When transistor Q1 is in the off state and transistor Q2 is in the on state, voltage VAC has a positive polarity.

FIG. 9 is a flow chart for describing a charge control process executed on batteries B1 and B2 by control device 60. The process in this flow chart is invoked from a main routine and executed at regular time intervals or each time predetermined conditions are met.

With reference to FIGS. 9 and 3, when the process is started, control device 60 determines in step S1 whether or not a charge command has been received. When a user presses charge button 53 of input/output switching device 52, input/output switching device 52 generates a charge command, and outputs the charge command to control device 60.

When the charge command has not been received (NO in step S1), the control returns to the main routine. When control device 60 receives the charge command in step S1 (YES in step S1), the process proceeds to step S2.

In step S2, control device 60 determines whether plug 51 is connected to connector 50. For example, control device 60 determines that plug 51 is connected to connector 50 by detecting physical insertion of plug 51 into connector 50.

When plug 51 is not connected to connector 50 (NO in step S2), the control returns to the main routine. When plug 51 is connected to connector 50 (YES in step S2), the process proceeds to step S3.

In step S3, control device 60 sends signals CONT3, CONT4 and CONT2 to relay RY1, relay RY2, system relay SR2, respectively. Relays RY1, RY2 and system relay SR2 are turned on accordingly.

In step S4, control device 60 controls transistors Q1, Q2, Q5 and Q6 to charge batteries B1 and B2. More specifically, control device 60 brings transistors Q1, Q2, Q5 and Q6 into the state shown in FIG. 6.

When battery B1 (B2) is brought into the fully-charged state, control device 60 terminates charging of battery B1 (B2). The operation for terminating charging of battery B1 (B2) executed by control device 60 will now be described. Control device 60 determines whether or not a state of charge SOC of battery B1 is lower than a threshold value indicative of the fully-charged state. When the state of charge SOC of battery B1 is higher than or equal to the threshold value indicative of the fully-charged state, control device 60 sends signal CONT4 at the L level to relay RY2. Since relay RY2 responds to signal CONT4 at the L level to be turned off, charging of battery B1 is terminated.

Similarly, control device 60 determines whether or not the state of charge SOC of battery B2 is lower than a threshold value indicative of the fully-charged state. When the state of charge SOC of battery B2 is higher than or equal to the threshold value indicative of the fully-charged state, control device 60 sends signal CONT2 at the L level to system relay SR2. System relay SR2 responds to signal CONT2 at the L level to be turned off, charging of battery B2 is terminated.

When charging of batteries B1 and B2 is terminated, control device 60 sends signal CONT3 at the L level to relay RY1 to turn of relay RY1. When relay RY1 is turned off, the charging operation in step S4 is terminated. With the termination of the charging operation in step S4, the control returns to the main routine.

In the present embodiment, batteries B1 and B2 are charged simultaneously. However, battery B1 may be charged first, and battery B2 may then be charged. Alternatively, battery B2 may be charged first, and battery B1 may then be charged. During charging of battery B1, control device 60 turns on relays RY1 and RY2, and turns off system relay SR2. During charging of battery B2, control device 60 turns off relay RY1 and system relay SR2, and turns on relay RY2.

FIG. 10 is a flow chart describing an AC power output process executed by control device 60. The process shown in this flow chart is invoked from a main routine and executed at regular time intervals or each time predetermined conditions are met.

With reference to FIGS. 10 and 3, at the start of the process, control device 60 determines in step S11 whether or not an AC power output command has been received. When a user presses AC output button 54 of input/output switching device 52, input/output switching device 52 generates the AC power output command, and outputs the AC power output command to control device 60.

When the AC power output command has not been received in step S11 (NO in step S11), the control returns to the main routine. When control device 60 receives the AC power output command in step S11 (YES in step S11), the process proceeds to step S12.

In step S12, control device 60 determines whether plug 51 is connected to connector 50. Since the operation in step S12 is similar to that in step S2 of FIG. 9, the same description will not be repeated. When plug 51 is not connected to connector 50 (NO in step S12), the control returns to the main routine. When plug 51 is connected to connector 50 (YES in step S12), the process proceeds to step S13.

In step S13, control device 60 turns on relays RY1, RY2 and system relay SR2. Since the operation in step S13 is similar to that in step S3 of FIG. 9, the same description will not be repeated.

In step S14, control device 60 controls transistors Q1 to Q6. Accordingly, boost converter 10 converts received DC power to AC power, and outputs the AC power to connector 50. More specifically, control device 60 brings transistors Q1, Q2, Q5 and Q6 into the state shown in FIG. 8. After the operation in step S14 is performed, the control returns to the main routine.

In the present embodiment, power supply line PL1 is a power line provided in common for battery B1 and commercial power supply 55. Boost converter 10 is a power conversion unit converting between DC power supplied to power supply line PL2 and one of AC power (power from commercial power supply 55) and DC power (DC power from battery B1) supplied to power supply line PL1.

It should be construed that embodiments disclosed herein are by way of illustration in all respects, not by way of limitation. It is intended that the scope of the present invention is defined by claims, not by the description above, and includes all modifications and variations equivalent in meaning and scope to the claims.

The invention claimed is:

1. An electrically-powered vehicle, comprising:
   first and second power storage devices being chargeable and dischargeable;

a first power line provided in common for said first power storage device and an AC power supply external to said electrically-powered vehicle;

a load device for receiving DC power to operate;

a second power line for supplying DC power to said load device;

a first power conversion unit for converting between DC power supplied to said second power line and one of AC power and DC power supplied to said first power line;

a voltage conversion unit electrically connected to said second power storage device and said second power line;

a first connection unit connected to said first power storage device and said first power line, and having a conducting state and a non-conducting state;

a second connection unit connected to said first power storage device and said voltage conversion unit, and having a conducting state and a non-conducting state; and a control device for controlling at least said voltage conversion unit, said first connection unit and said second connection unit, when AC power is supplied to said first power line from outside said electrically-powered vehicle, said control device controlling said first connection unit to take the non-conducting state and said second connection unit to take the conducting state and controlling said voltage conversion unit such that a target voltage is supplied to said first and second power storage devices, based on a voltage value of DC power supplied to said second power line.

2. The electrically-powered vehicle according to claim 1, wherein when AC power is output from said electrically-powered vehicle, said control device controls said first connection unit to take the non-conducting state and said second connection unit to take the conducting state and controls said voltage conversion unit such that a DC voltage is supplied to said second power line, and said first power conversion unit converts DC power received through said second power line to AC power to output the converted AC power to said first power line.

3. The electrically-powered vehicle according to claim 1, wherein said second power line includes
   a positive bus line, and
   a negative bus line, said first power conversion unit includes
   an inductor having one end connected to said first power line,
   a first switching element connected between the other end of said inductor and said positive bus line,
   a second switching element connected between said other end of said inductor and said negative bus line,
   third and fourth switching elements connected in series between said positive bus line and said negative bus line,
   first and second diodes connected in antiparallel to said first and second switching elements, respectively, and
   third and fourth diodes connected in antiparallel to said third and fourth switching elements, respectively.

4. The electrically-powered vehicle according to claim 1, wherein said load device includes
   a second power conversion unit for converting DC power supplied to said second power line to AC power, and
   a motor for receiving the AC power converted by said second power conversion unit to generate driving force for driving said electrically-powered vehicle.

* * * * *